F. J. LAIBLE.
VEHICLE CURTAIN LIGHT.
APPLICATION FILED MAR. 10, 1919.

1,313,999.

Patented Aug. 26, 1919.
2 SHEETS—SHEET 1.

INVENTOR:
Frank J. Laible
Walter F. Murray
atty.

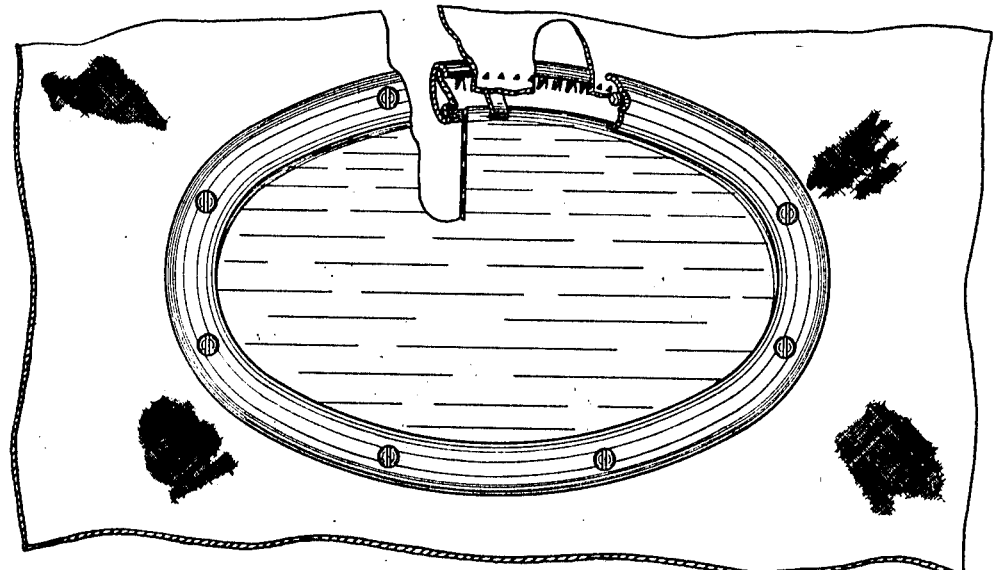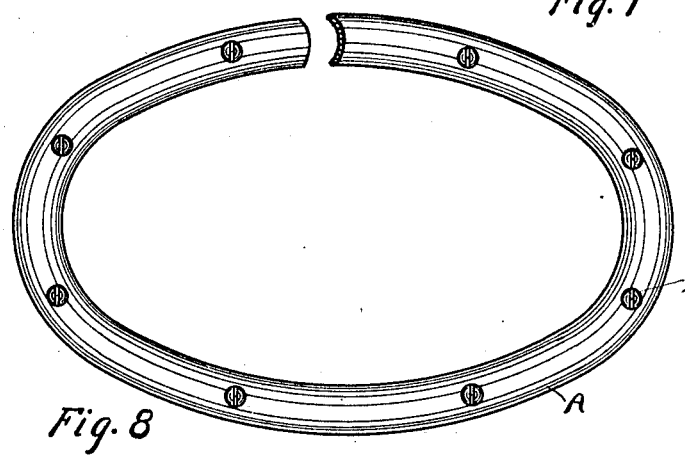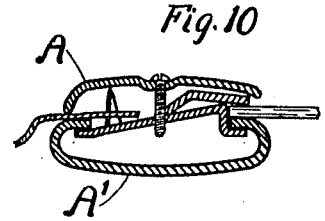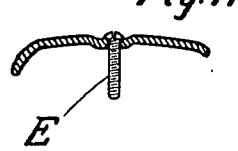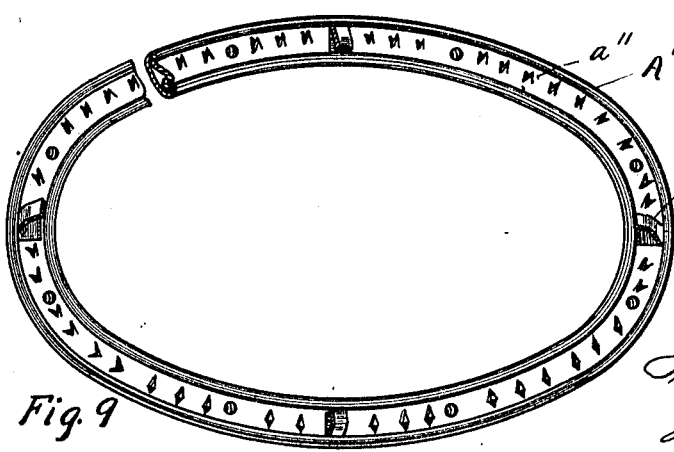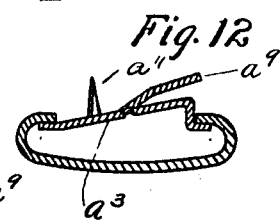

UNITED STATES PATENT OFFICE.

FRANK J. LAIBLE, OF AUGUSTA, KENTUCKY, ASSIGNOR TO THE F. A. NEIDER COMPANY, OF AUGUSTA, KENTUCKY, A CORPORATION OF KENTUCKY.

VEHICLE-CURTAIN LIGHT.

1,313,999.   Specification of Letters Patent.   Patented Aug. 26, 1919.

Application filed March 10, 1919. Serial No. 281,686.

*To all whom it may concern:*

Be it known that I, FRANK J. LAIBLE, a citizen of the United States of America, and a resident of Augusta, in the county of Bracken and State of Kentucky, have invented a new and useful Improvement in Vehicle-Curtain Lights, of which the following is a specification.

My invention relates to the class of vehicle curtain lights in which the transparency is glass, which is mounted in a frame.

An object of my invention is a vehicle curtain light of this class in which the curtain and the glass may both be fastened securely to the frame.

Another object is a simple means for clamping the glass in the frame, which will not split the glass.

Another object is a light which may be secured easily in a curtain.

These objects are attained by the means described in the specification and illustrated in the accompanying drawings, in which like parts are indicated by similar reference numbers.

Fig. 7 is a view similar to Fig. 1, but of a modified form.

Figs. 8, 9, 10, 11, 12, are views similar to Figs. 2, 3, 4, 5 and 6, but of the modified form shown in Fig. 7.

Figure 1:
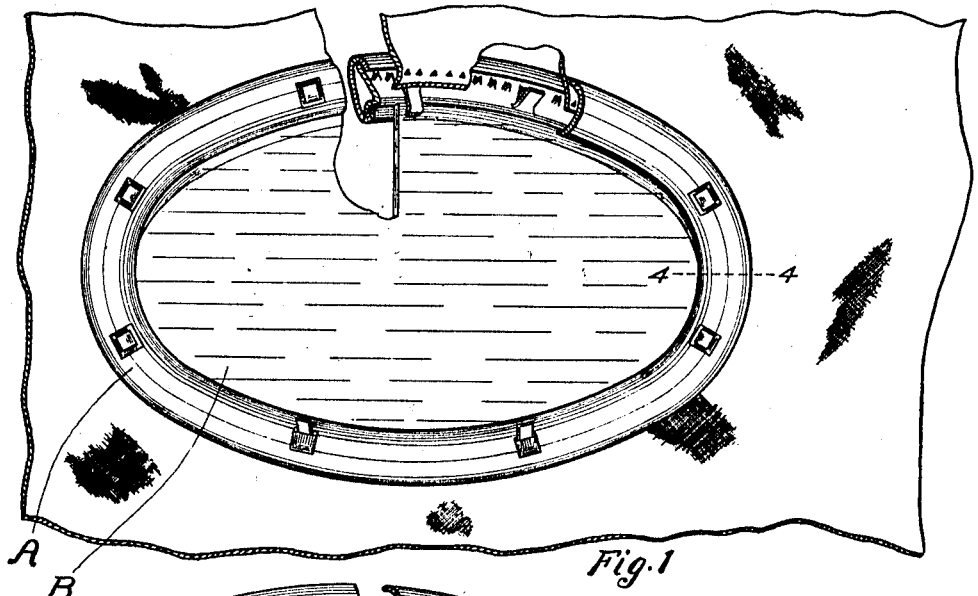
Figure 1, is a rear elevation of a vehicle curtain light embodying my invention, and a part of a curtain to which it is secured, parts of the device being shown in section.
Figure 2:
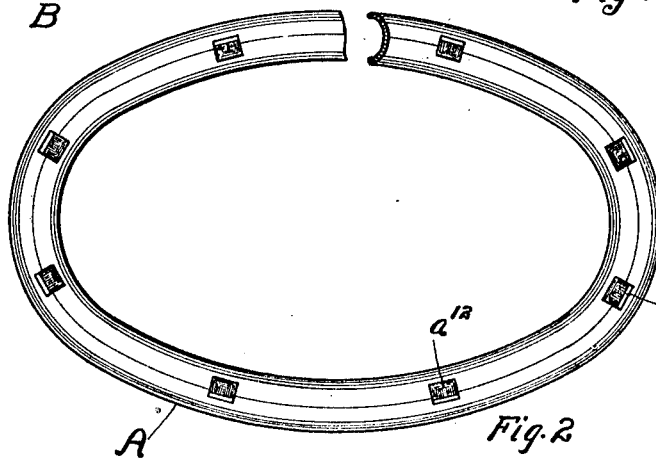
Fig. 2, is a rear elevation of one of the frame members of my device, part thereof being shown broken out.
Figure 3:
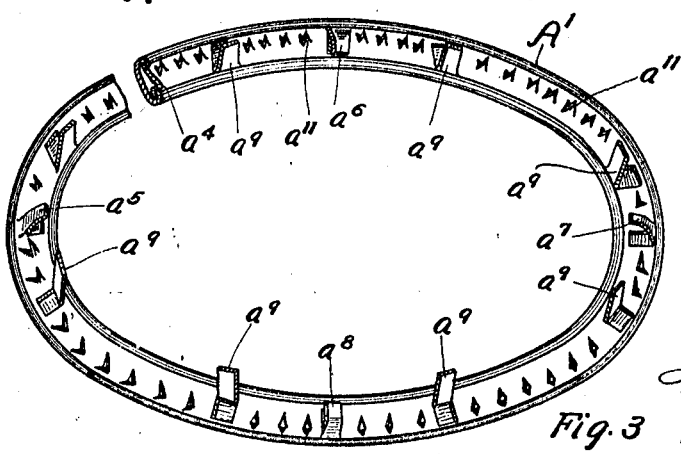
Fig. 3, is a rear elevation of the other member of the frame, showing the lugs thereof and the position for receiving the transparency and the curtain.
Figure 4:
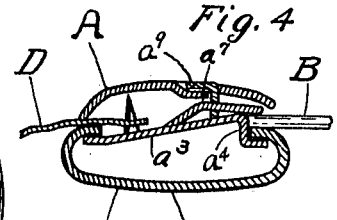
Fig. 4, is an enlarged sectional view taken upon line 4—4 of Fig. 1.
Figure 5:
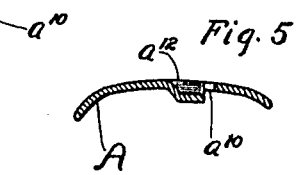
Fig. 5, is a sectional view similar to Fig. 4, of the inner member of the frame.
Figure 6:
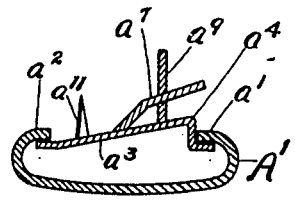
Fig. 6, is a view similar to Fig. 5, of the outer member of the frame.

Referring to the parts. The vehicle curtain light embodying my invention consists of inner and outer frame members A, A' and a pane of glass B. The outer frame A' consists of an imperforate metal frame $a$, which acts as support or housing for an oval lug frame $a^3$. Frame $a$ has its edges $a'$, $a^2$, inturned over the edges $a'$, $a^2$, of the lug frame.

Lug frame $a^3$ has in it an outwardly projecting annular ridge $a^4$, which projects beyond the edge $a'$ a distance slightly greater than the thickness of the pane B, so that the ridge acts as a protection against the glass being too firmly clamped in the frame. Lug frame $a^3$ has in it a series of lugs $a^5$, $a^6$, $a^7$, $a^8$, which are formed by cutting tongues from the lug frame so that their attaching end is adjacent to the outer edge of the lug frame.

Lugs $a^5$—$a^8$, are bent downward to contact with the pane B to hold it in place. The lug frame likewise has a series of lugs $a^9$ which are formed by cutting tongues from the lug frame with the attaching edges adjacent to the inner periphery of the lug frame $a^3$, and bending the tongues outward from the frame. Lugs $a^9$ are adapted to pass through slots $a^{10}$ which are made in the frame member A, so as to register with the lugs $a^9$ when the frame members A, A' are placed together. Lug frame $a^3$, has in it a series of barbs $a^{11}$, which are struck outward from the face thereof.

Adjacent to the slots $a^{10}$ in the frame A, are a series of depressions $a^{12}$, in which the ends of the lugs $a^9$ seat when the frame members are coupled together.

In use the manufacturer of my vehicle curtain light places the pane B in the frame A', with its edges contacting with the A', and secures the pane in place by ridge $a^4$, and secures the pane in place by turning down the lugs $a^9$ so that they contact with the pane. Then the manufacturer ships the device to the vehicle manufacturer with the frame member A disconnected from the frame member A', and its assembled pane B. The vehicle manufacturer places curtain D, in which is cut a hole substantially equal to the size and shape of the pane B, upon the frame A' so that the barbs all project through the curtain, and frame A is placed upon frame A' so that the lugs $a^9$ project through the slots $a^{10}$. Thereupon the lugs $a^9$ are turned down into the recesses $a^{12}$.

The modified illustration in Figs. 7–12, is similar to that just described except in the means for holding the frames A, A' together. In the modification lugs $a^7$ and slots $a^{10}$ are omitted and in place thereof a series of screw threaded holes are made in the lug frame $a^3$ and the frame A in which a series of screws are seated.

What I claim is:—

1. In a vehicle curtain light the combination of two frame members one of which consists of a frame having in it a series of slots and the other of which comprises a lug plate and a housing for the lug plate, the housing having inturned edges overlapping the edges of the lug plate, said lug plate having a series of lugs adapted to engage a pane of glass and a series of lugs adapted to engage the other frame member and a pane of glass located between the frame members.

2. In a vehicle curtain light the combination of frame members one of which comprises a substantially oval lug plate and a substantially oval housing for the lug plate whose edges project over the edges of the lug plate, the lug plate having in it an annular ridge adapted to contact with the outer edges of a pane of glass, a series of lugs struck from it and overlapping the pane of glass, and a series of barbs adapted to pass through the vehicle curtain, an inner frame and means for connecting the inner and outer frames together with the vehicle curtain and a pane of glass between them.

In testimony whereof, I have hereunto subscribed my name this 6th day of March, 1919.

FRANK J. LAIBLE.

Witnesses:
EDWIN C. TOLEMAN,
WILL A. FIELD.

Copies of this patent may be obtained for five cents each, by addressing the "Commissioner of Patents, Washington, D. C."